J. R. GILMAN.
TROLLEY WHEEL.
APPLICATION FILED JAN. 4, 1910.

992,713.

Patented May 16, 1911.

2 SHEETS—SHEET 1.

Witnesses

Inventor
James R. Gilman
By
Attorneys

J. R. GILMAN.
TROLLEY WHEEL.
APPLICATION FILED JAN. 4, 1910.

992,713.

Patented May 16, 1911.
2 SHEETS—SHEET 2.

Witnesses

Inventor
James R. Gilman
By
Attorneys

UNITED STATES PATENT OFFICE.

JAMES R. GILMAN, OF LOUISVILLE, KENTUCKY, ASSIGNOR TO CHARLES L. REDDING, OF LOUISVILLE, KENTUCKY.

TROLLEY-WHEEL.

992,713. Specification of Letters Patent. Patented May 16, 1911.

Application filed January 4, 1910. Serial No. 536,330.

*To all whom it may concern:*

Be it known that I, JAMES R. GILMAN, a citizen of the United States, residing at Louisville, in the county of Jefferson, State of Kentucky, have invented certain new and useful Improvements in Trolley-Wheels; and I do hereby declare the following to be a full, clear, and exact description of the invention, such as will enable others skilled in the art to which it appertains to make and use the same.

The invention relates to trolley wheels and more particularly to the class of self-lubricating ball bearing trolley wheels.

The primary object of the invention is the provision of a trolley wheel in which its wire engaging rim is detachably mounted so that the same when become worn may be replaced by a new one thus increasing the life of the trolley wheel.

Another object of the invention is the provision of a wheel in which its rim is separable from the hub at will so that the said rim may be renewed should it become injured or worn and which rim is mounted upon ball bearings so as to permit the rim to freely rotate and thus prevent the wheel sliding upon a trolley wire when in use.

A further object of the invention is the provision of a trolley wheel in which the rim and hub portions are separable from each other so that one may be detached from the other, and formed so that there would be no possibility of the wheel sliding when contacting with a trolley wire, the rim being locked relative to the hub so as to prevent accidental displacement or detachment from the latter, although permitting it to be removed at will.

With these and other objects in view, the invention consists in the construction, combination and arrangement of parts as will be hereinafter more fully described in detail, illustrated in the accompanying drawings, which disclose the preferred form of embodiment of the invention, to enable those skilled in the art to practice the invention, and as pointed out in the claims hereunto appended.

Figure 1:
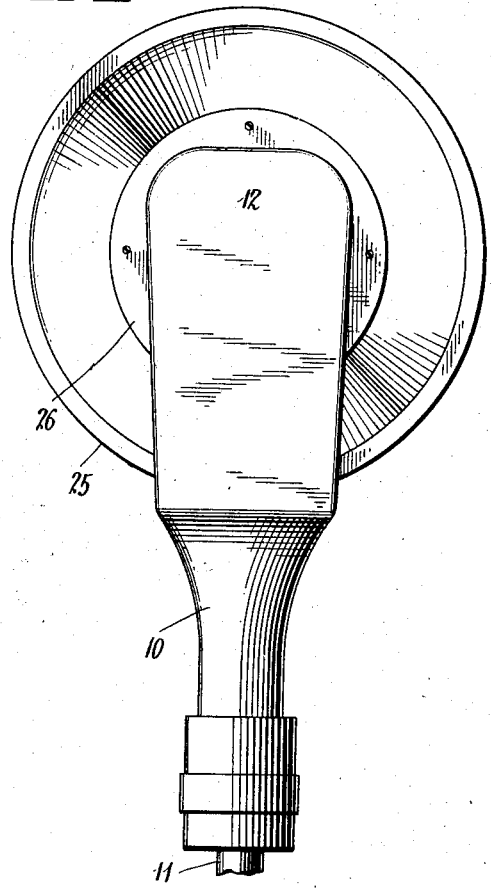
Figure 2:
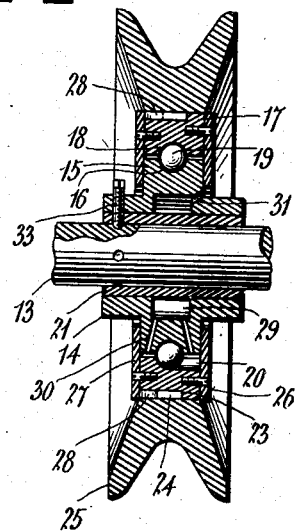
Figure 4:
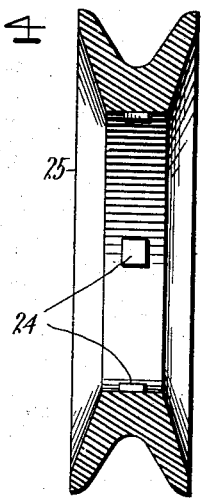
Figure 3:
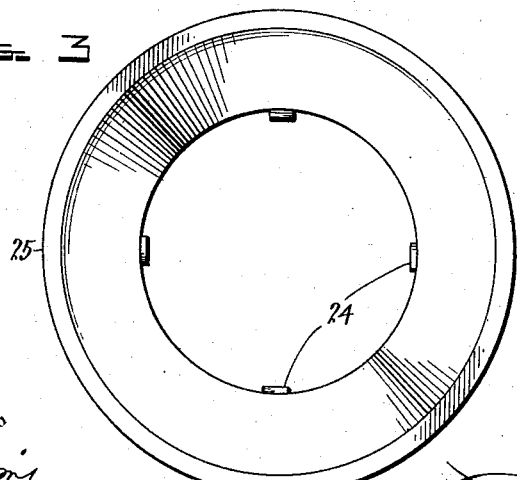
Figure 8:
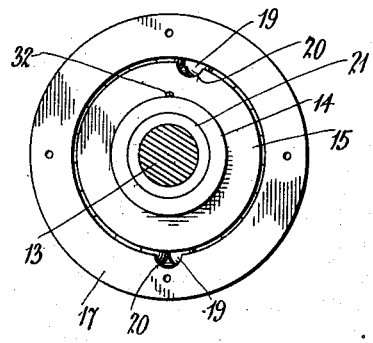
Figure 6:
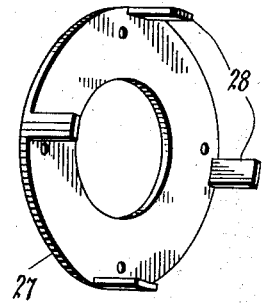
Figure 7:
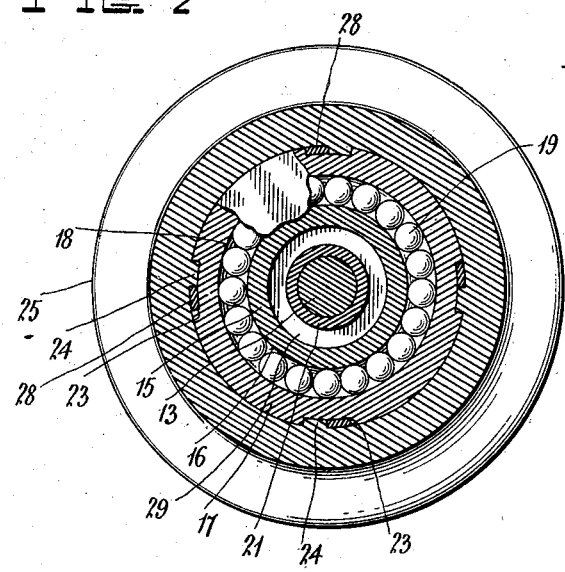
Figure 5:
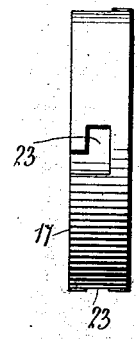

In the drawings:—Figure 1 is a side elevation of a trolley harp with the trolley wheel mounted therein in accordance with the invention. Fig. 2 is a transverse sectional view through the wheel. Fig. 3 is a side elevation of the wire engaging rim removed from the hub of the wheel. Fig. 4 is a transverse sectional view through the same. Fig. 5 is an edge view of the annulus or ring detached from the rim. Fig. 6 is a perspective view of the locking disk or side plate. Fig. 7 is a central sectional view through the wheel. Fig. 8 is a side elevation of the hub and annulus with the side plate removed.

Similar reference characters indicate corresponding parts throughout the several views in the drawings.

In carrying the invention into practice the general shape and type of trolley harp is used.

Referring to the drawings by numerals, 10 designates the body of the harp which is attached to a pole or mast by a shank 11, in the usual way and this body is formed with spaced cheeks 12, supporting a centrally located transverse journal or spindle 13, upon which is mounted the trolley wheel as will be hereinafter more fully described.

The trolley wheel comprises a hub 14, provided with an integral central annular web 15, in the outer circumferential surface of which is formed a semi-circular raceway or groove 16, and circumscribing this web 15, is an annulus or ring 17, the same being provided on its inner circumference with a semi-circular raceway or groove 18, the latter being adapted to register with the raceway in the web 15, of the hub. Confined within these registering raceways in the web and annulus 15 and 17, are a series of balls 19, the latter being introduced therein through suitable ports 20 opening through one side of the said annulus and web and communicating with the raceways therein. The ports 20, being adapted to be brought into register with each other when it is desired to insert the balls in the hubs, and these ports 20, are closed in a manner as will be hereinafter described.

Interposed between the spindle 13 and the hub 14, is a bushing or wearing sleeve 21, the latter being snugly held in the hub.

Provided in the outer circumferential face of the annulus 17, at suitable intervals thereof, are L-shaped slots 23, each of which opens through one side of said annulus and in these slots 23, are engaged inwardly projecting lugs 24, protruding from the inner circumference of a detachable grooved rim 25, preferably constructed of brass, and adapted to engage a trolley wire. These lugs 24, are introduced into the open ends of the L-shaped slots 23, and are moved into the inner right angular closed terminals of the said slots 23, to securely mount the rim upon the annulus.

Suitably secured to one side face of the annulus or ring 17, is a side disk or plate 26, which latter overlaps the web 15, of the hub and serves as a closure for the ports 20, and also aids in preventing lateral displacement of the annulus on the web. To the opposite face of said annulus or ring 17, is secured a side disk or plate 27, the latter having at its periphery right angular extensions or ears 28, which engage in the open extremities of the L-shaped slots 23, so as to prevent displacement of the lugs 24 on the rim 25, in said slots 23, and also to securely lock the rim on the annulus. It is clearly obvious that upon removing the plate 27, the rim 25, may be readily detached from the annulus or ring 17, so that should the rim 25, be severely worn or injured a new one may be placed upon the annulus in its stead. Therefore it is evident that the life of the trolley wheel may be materially increased.

Formed centrally in the inner face of the hub 14, in an annular oil chamber 29, the latter having leading therefrom oil passages 30, to opposite sides of the raceway 16, in the web so that oil or other lubricant will be fed to the balls 19, from the oil chamber 29, in the hub. Oil is introduced into the chamber through an inlet 31, which is closed by a screw member 32.

The bushing or sleeve 21, is held fast in the hub by means of a set screw 33, which enables the bushing to be renewed at will and also this set screw 33 locks the hub 14, upon the spindle 13 held in the harp.

What is claimed is:—

1. In combination, a rim having internal lugs, an annulus having a raceway and formed with L-shaped slots to receive the lugs, said annulus being disposed within the rim and the lugs being located in the slots, means for holding the annulus against movement on the rim, a hub having a raceway registering with the annulus raceway, balls disposed within the raceways and a side plate secured to the annulus and engaging the hub.

2. A wheel comprising a rim having internal spaced lugs, an annulus formed with slots to receive the lugs and located within the rim, a side plate secured against the annulus and rim and formed with ears projecting into the slots and engaging said lugs to prevent their displacement in said slots, said annulus having a raceway registering with the raceway of the annulus and balls disposed in the raceways.

3. In combination, a hub, a rim, said hub having a raceway and disposed within said rim, an annulus disposed between the rim and the hub and formed with a raceway registering with the hub raceway, said annulus being provided with circumferential L-shaped slots and said rim being formed with internal lugs disposed in said L-shaped slots of the annulus, a side plate secured against one side of the hub and the annulus, and a side plate secured against the other side of the hub and annulus and formed with lateral ears projecting into the slots of the annulus and engaging the lugs of the rim to prevent displacement of said lugs in the slots of the annulus.

In testimony whereof, I affix my signature, in presence of two witnesses.

JAMES R. GILMAN.

Witnesses:
RICH M. HOUSER,
L. RIENHOUDT.

---

Copies of this patent may be obtained for five cents each, by addressing the "Commissioner of Patents, Washington, D. C."